E. D. FRENCH.

Improvement in Horse-Covers.

No. 131,433. Patented Sep. 17, 1872.

UNITED STATES PATENT OFFICE.

EMMOR D. FRENCH, OF CAMDEN, NEW JERSEY.

IMPROVEMENT IN HORSE-COVERS.

Specification forming part of Letters Patent No. 131,433, dated September 17, 1872.

*To all whom it may concern:*

Be it known that I, EMMOR D. FRENCH, of Camden, in the county of Camden and State of New Jersey, have invented a new and Improved Horse-Blanket; and I do hereby declare that the following is a full, clear, and exact description thereof, reference being had to the accompanying drawing making part of this specification, in which—

Figure 1:
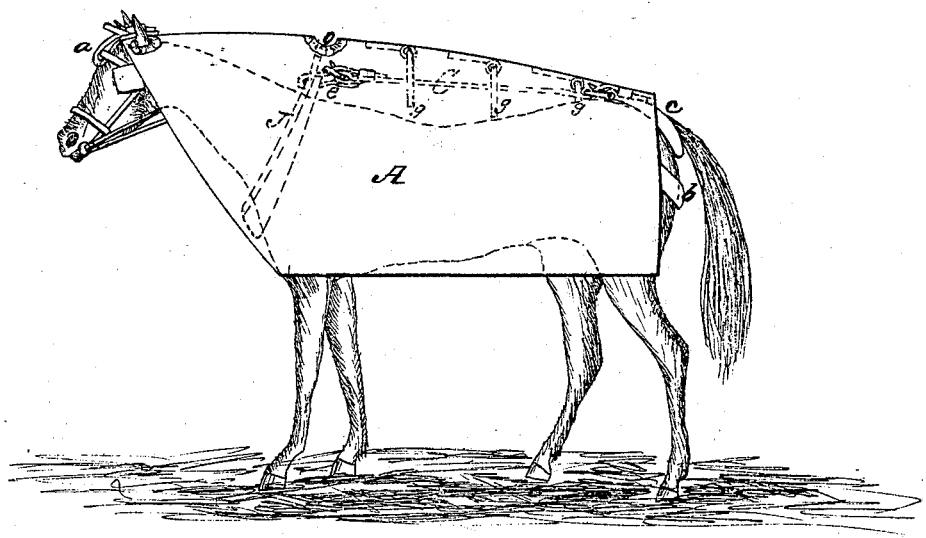
Figure 2:
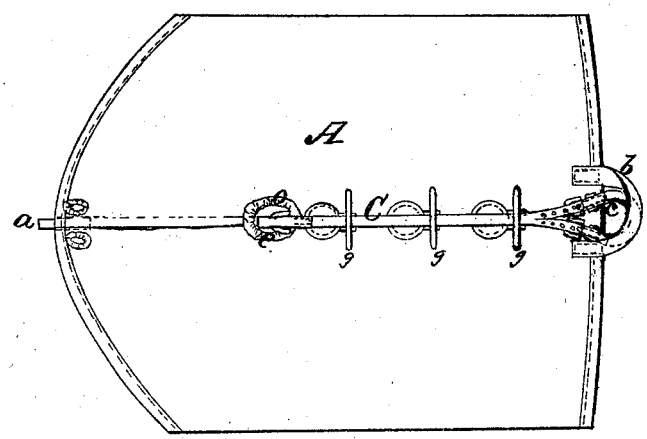

Figure 1 is a side view of the cover applied to a horse. Fig. 2 is a view of the inside of the cover with the crupper-strap attached.

Similar letters of reference indicate corresponding parts in the two figures.

The object of this invention is to improve horse-blankets, so that they will set off from the back of the animal, and allow currents of air to circulate freely beneath them. At the same time they are prevented from side-displacement, as will be hereinafter explained.

The following description of my invention will enable others skilled in the art to understand it.

In the accompanying drawing, A represents the cover or blanket, which may be made of any suitable material. This cover is designed to protect the animal from the rays of the sun, and for this purpose it extends from the head to the tail, and hangs well down on each side. It is composed of two side pieces, united along the back, and cut so that when the edges are sewed together and the cover applied to the animal the back part of it will stand off from the horse, as shown in Fig. 1, and allow a free circulation of air beneath it. The front end of the cover A extends over the head of the horse, and is attached to the front band by a strap and buckle, *a*. The rear end of the cover is attached by a crupper-strap, *b*, to the buttock of the animal. These front and rear attachments prevent displacement of the cover longitudinally. To prevent lateral displacement of the cover, back of the neck portion, I employ a crupper, *c*, the strap C of which is attached to the hames at *e*, and passed through rings or loops *g*, which are fastened to the cover at proper distances apart.

It will be seen from the above description that the back of the cover is convex longitudinally, and when fastened upon a horse as I have described it will stand off from his back, and thus allow currents of air—which enter between the cover and the horse in front—to circulate freely about the sides and back of the animal, and keep him cool.

I contemplate using these covers as a means for advertising business as well as a protection to horses.

Having described my invention, what I claim as new, and desire to secure by Letters Patent, is—

The cover A, with its convex back seam, in combination with the front and back fastenings *a b g e*, substantially as described.

Witness my hand in matter of my application for a patent for an improved horse-blanket this 13th July, A. D. 1872.

EMMOR D. FRENCH.

Witnesses:
    J. N. CAMPBELL,
    R. V. CAMPBELL.